United States Patent
Doyle

(10) Patent No.: US 6,882,349 B2
(45) Date of Patent: Apr. 19, 2005

(54) EFFICIENT IMAGE ALLOCATION FOR ZONE RENDERING

(75) Inventor: Peter L. Doyle, El Dorado Hills, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 10/038,787

(22) Filed: Dec. 31, 2001

(65) Prior Publication Data

US 2003/0122851 A1 Jul. 3, 2003

(51) Int. Cl.$^7$ .................................................. G09G 5/00
(52) U.S. Cl. ................... 345/620; 345/622; 345/623; 345/625; 345/628; 345/642; 382/173
(58) Field of Search .............................. 345/622, 628, 345/642, 624, 620

(56) References Cited

U.S. PATENT DOCUMENTS

| | | | | |
|---|---|---|---|---|
| 4,982,345 A | * | 1/1991 | Callahan et al. ............ | 345/628 |
| 5,581,796 A | * | 12/1996 | Koga et al. ................. | 345/623 |
| 5,850,475 A | * | 12/1998 | Kasao ........................ | 382/173 |
| 6,144,387 A | * | 11/2000 | Liu et al. ..................... | 345/427 |
| 6,344,852 B1 | * | 2/2002 | Zhu et al. ................... | 345/418 |
| 6,377,276 B1 | * | 4/2002 | Ludtke ........................ | 345/620 |
| 6,424,345 B1 | * | 7/2002 | Smith et al. ................. | 345/423 |
| 6,437,780 B1 | * | 8/2002 | Baltaretu et al. ............ | 345/423 |
| 6,693,637 B1 | * | 2/2004 | Koneru et al. .............. | 345/501 |
| 2002/0140710 A1 | * | 10/2002 | Fliflet ........................ | 345/660 |

\* cited by examiner

Primary Examiner—Matthew C. Bella
Assistant Examiner—Antonio Caschera
(74) Attorney, Agent, or Firm—Sharon Wong

(57) ABSTRACT

Embodiments of the present invention efficiently support rendering of high resolution images under zone rendering. In particular, a bin array rectangle and binner clipping rectangle for determining primitive-zone intersections. Both of these rectangles are defined by graphics device state variables containing the screen-space location of the rectangle corners. In particular, the binner clipping rectangle is used to define the visible region in screen coordinates. Objects completely outside the binner clipping rectangle in one or more directions will be discarded. Objects that cannot be trivially rejected are subjected to bin determination. The bin array rectangle handles color buffer resolutions larger than could otherwise be accommodated by the optimally-renderer image limits.

25 Claims, 6 Drawing Sheets

EFFICIENT IMAGE ALLOCATION FOR ZONE RENDERING

BACKGROUND

1. Field

The present invention relates generally to graphics systems and more particularly to graphics-rendering systems.

2. Background Information

Computer graphics systems are commonly used for displaying graphical representations of objects on a two-dimensional video display screen. Current computer graphics systems provide highly detailed representations and are used in a variety of applications. In typical computer graphics systems, an object to be represented on the display screen is broken down into graphics primitives. Primitives are basic components of a graphics display and may include points, lines, vectors and polygons, such as triangles and quadrilaterals. Typically, a hardware/software scheme is implemented to render or draw the graphics primitives that represent a view of one or more objects being represented on the display screen.

The primitives of the three-dimensional objects to be rendered are defined by a host computer in terms of primitive data. For example, when the primitive is a triangle, the host computer may define the primitive in terms of X, Y and Z coordinates of its vertices, as well as the red, green and blue (R, G and B) color values of each vertex. Additional primitive data may be used in specific applications.

Image rendering is the conversion of a high-level object-based description into a graphical image for display on some display device. For example, an act of image rendering occurs during the conversion of a mathematical model of a three-dimensional object or scene into a bitmap image. Another example of image rendering is converting an HTML document into an image for display on a computer monitor. Typically, a hardware device referred to as a graphics-rendering engine performs these graphics processing tasks. Graphics-rendering engines typically render scenes into a buffer that is subsequently output to the graphical output device, but it is possible for some rendering-engines to write their two-dimensional output directly to the output device. The graphics-rendering engine interpolates the primitive data to compute the display screen pixels that represent the each primitive, and the R, G and B color values of each pixel.

A graphics-rendering system (or subsystem), as used herein, refers to all of the levels of processing between an application program and a graphical output device. A graphics engine can provide for one or more modes of rendering, including zone rendering. Zone rendering attempts to increase overall 3D rendering performance by gaining optimal render cache utilization, thereby reducing pixel color and depth memory read/write bottlenecks. In zone rendering, a screen is subdivided into an array of zones and per-zone instruction bins, used to hold all of the primitive and state setting instructions required to render each sub-image, are generated. Whenever a primitive intersects (or possibly intersects) a zone, that primitive instruction is placed in the bin for that zone. Some primitives will intersect more than one zone, in which case the primitive instruction is replicated in the corresponding bins. This process is continued until the entire scene is sorted into the bins. Following the first pass of building a bin for each zone intersected by a primitive, a second zone-by-zone rendering pass is performed. In particular, the bins for all the zones are rendered to generate the final image.

What is needed therefore is an efficient image/bin allocation method and apparatus for zone rendering.

DETAILED DESCRIPTION

Figure 1:
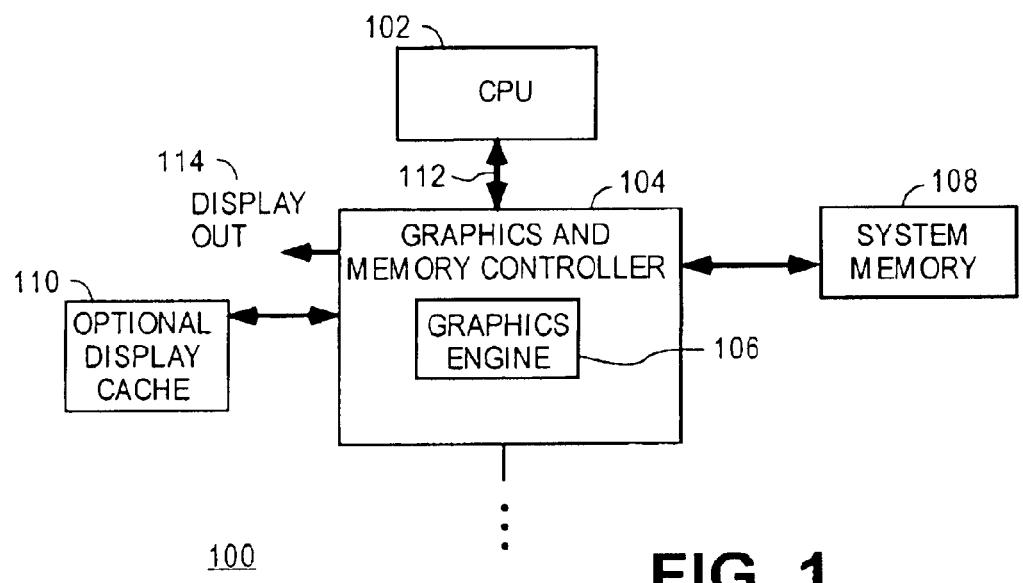
FIG. 1 illustrates a block diagram of an embodiment of a computer system including an embodiment of a graphics device for implementing efficient image/bin allocation for zone rendering.

Embodiments of the present invention efficiently support rendering of high resolution images under zone rendering. In particular, a bin array rectangle and binner clipping rectangle for determining primitive-zone intersections. Both of these rectangles are defined by graphics device state variables containing the screen-space location of the rectangle corners. In particular, the binner clipping rectangle is used to define the visible region in screen coordinates. Objects completely outside the binner clipping rectangle in one or more directions will be discarded. Objects that cannot be trivially rejected are subjected to bin determination. The bin array rectangle handles color buffer resolutions larger than could otherwise be accommodated by the optimally-renderer image limits.

In the detailed description, numerous specific details are set forth in order to provide a thorough understanding of the present invention. However, it will be understood by those skilled in the art that the present invention maybe practiced without these specific details. In other instances, well-known methods, procedures, components and circuits have been described in detail so as not to obscure the present invention.

Some portions of the detailed description that follow are presented in terms of algorithms and symbolic representations of operations on data bits or binary signals within a computer. These algorithmic descriptions and representations are the means used by those skilled in the data processing arts to convey the substance of their work to others skilled in the art. An algorithm is here, and generally, considered to be a self-consistent sequence of steps leading to a desired result. The steps include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities. Unless specifically stated otherwise as apparent from the following discussions, it is appreciated that throughout the specification, discussions utilizing such terms as "processing" or "computing" or "calculating" or "determining" or the like, refer to the action and processes of a computer or computing system, or similar electronic computing device, that manipulate and transform data represented as physical (electronic) quantities within the computing system's registers and/or memories into other data similarly represented as physical quantities within the computing system's memories, registers or other such information storage, transmission or display devices.

Embodiments of the present invention may be implemented in hardware or software, or a combination of both. However, embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system includes any system that has a processor, such as, for example, a digital signal processor (DSP), a micro-controller, an application specific integrated circuit (ASIC), or a microprocessor.

The programs may be implemented in a high level procedural or object oriented programming language to communicate with a processing system. The programs may also be implemented in assembly or machine language, if desired. In fact, the invention is not limited in scope to any particular programming language. In any case, the language may be a compiled or interpreted language.

The programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

An example of one such type of processing system is shown in FIG. 1. Sample system 100 may be used, for example, to execute the processing for methods in accordance with the present invention, such as the embodiment described herein. Sample system 100 is representative of processing systems based on the microprocessors available from Intel Corporation, although other systems (including personal computers (PCs) having other microprocessors, engineering workstations, set-top boxes and the like) may also be used. In one embodiment, sample system 100 may be executing a version of the WINDOWS.TM. operating system available from Microsoft Corporation, although other operating systems and graphical user interfaces, for example, may also be used.

FIG. 1 is a block diagram of a system 100 of one embodiment of the present invention. The computer system 100 includes central processor 102, graphics and memory controller 104 including graphics device 106, memory 108 and display device 114. Processor 102 processes data signals and may be a complex instruction set computer (CISC) microprocessor, a reduced instruction set computing (RISC) microprocessor, a very long instruction word (VLIW) microprocessor, a process implementing a combination of instruction sets, or other processor device, such as a digital signal processor, for example. Processor 102 may be coupled to common bus 112 that transmits data signals between processor 102 and other components in the system 100. FIG. 1 is for illustrative purposes only. The present invention can also be utilized in a configuration including a descrete graphics device.

Processor 102 issues signals over common bus 112 for communicating with memory 108 or graphics and memory controller 104 in order to manipulate data as described herein. Processor 102 issues such signals in response to software instructions that it obtains from memory 108. Memory 108 may be a dynamic random access memory (DRAM) device, a static random access memory (SRAM) device, or other memory device. Memory 108 may store instructions and/or data represented by data signals that may be executed by processor 102, graphics device 106 or some other device. The instructions and/or data may comprise code for performing any and/or all of the techniques of the present invention. Memory 108 may also contain software and/or data. An optional cache memory 110 may be used to speed up memory accesses by the graphics device 106 by taking advantage of its locality of access. In some embodiments, graphics device 106 can offload from processor 102 many of the memory-intensive tasks required for rendering an image. Graphics device 106 processes data signals and may be a complex instruction set computer (CISC) microprocessor, a reduced instruction set computing (RISC) microprocessor, a very long instruction word (VLIW) microprocessor, a process implementing a combination of instruction sets, or other processor device, such as a digital signal processor, for example. Graphics device 106 may be coupled to common bus 112 that transmits data signals between graphics device 106 and other components in the system 100, including render cache 110 and display device 114. Graphics device 106 includes rendering hardware that among other things writes specific attributes (e.g. colors) to specific pixels of display 114 and draw complicated primitives on display device 114. Graphics and memory controller 104 communicates with display device 114 for displaying images rendered or otherwise processed by a graphics controller 104. Display device 114 may comprise a computer monitor, television set, flat panel display or other suitable display device.

Memory 108 stores a host operating system that may include one or more rendering programs to build the images of graphics primitives for display. System 100 includes graphics device 106, such as a graphics accelerator that uses customized hardware logic device or a co-processor to improve the performance of rendering at least some portion of the graphics primitives otherwise handled by host rendering programs. The host operating system program and its host graphics application program interface (API) control the graphics device 106 through a driver program.

Figure 2:
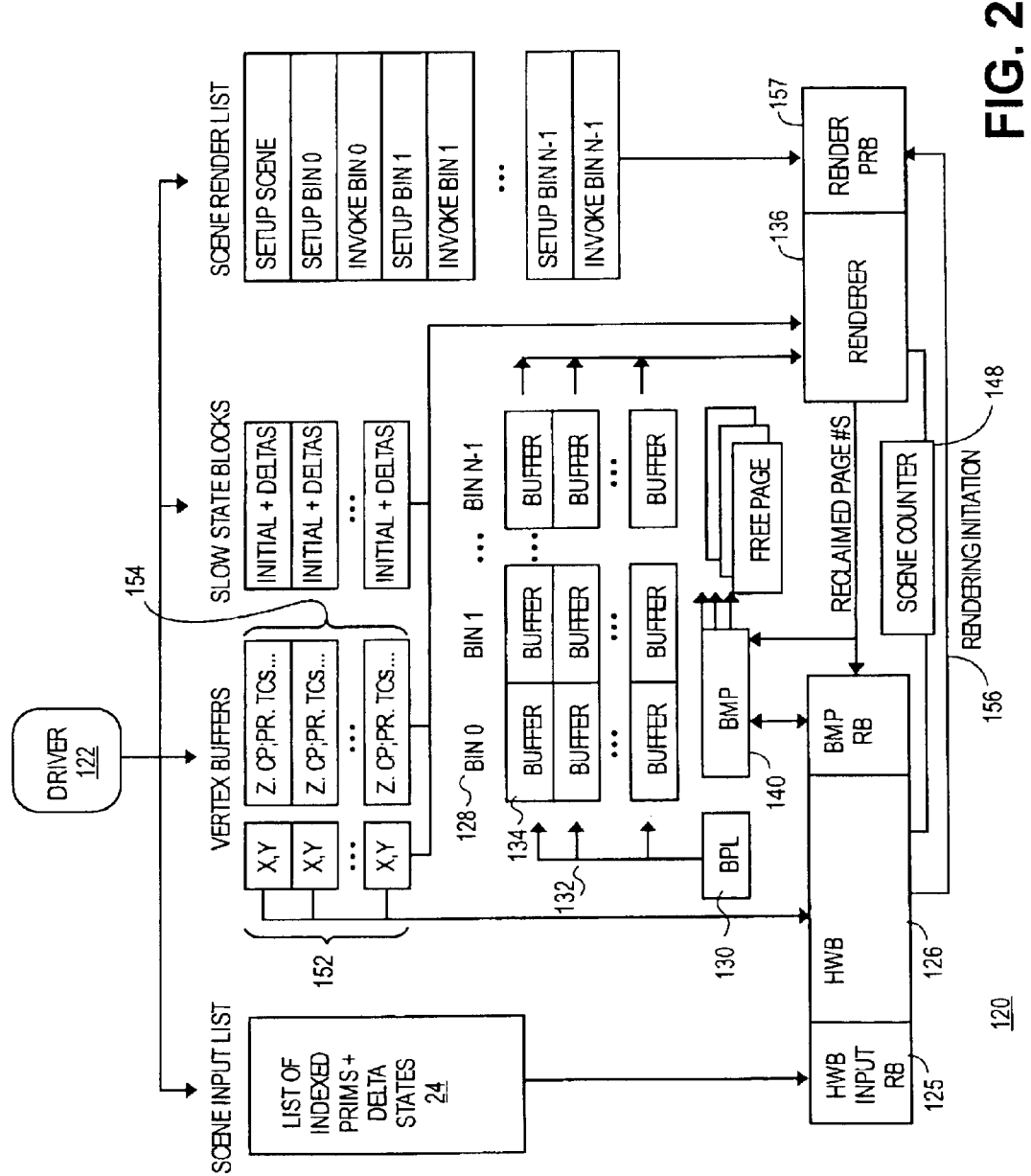
FIG. 2 illustrates a block diagram of an embodiment of a graphics device including a graphics-binning engine, graphics-rendering engine and bins.
Figure 3:
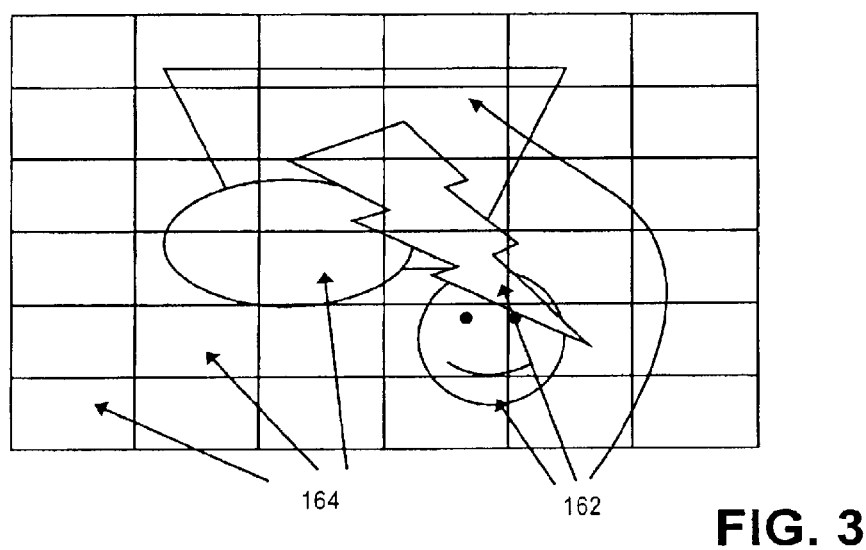
FIG. 3 illustrates a depiction of an embodiment of a zone renderer screen view including zones and geometrical primitives.

FIG. 2 illustrates a block diagram of an embodiment 120 of a graphics device including a graphics-binning engine 120, vertex buffers 150 including first buffer 152 including only vertex X and Y data, graphics-rendering engine 136 and bins 128. FIG. 3 illustrates an embodiment 160 of various screen objects implemented on a zone rendering system 120 (shown in FIG. 2) is illustrated. Referring to FIGS. 2 and 3, a screen object to be presented on the display screen is broken down into graphics primitives 162. Primitives 162 may include, but are not limited to, graphical objects such as polygons (e.g., triangles and quadrilaterals), lines, points and vectors. The graphics engine 106 is implemented to render, or draw, the graphics primitives 162 that represent a view of one or more screen objects being represented on the display screen. In zone rendering, a screen is subdivided into an array of zones 164 commonly screen-space rectangles although other geometric variants may be used as well. Each zone 164 is associated with a bin. Each bin 128 includes a chained series of command buffers 134 stored within non-contiguous physical memory pages. The bins 128 are thus preferably implemented as a chain of independent physical pages.

When a primitive 162 intersects a zone 164, the corresponding primitive instruction is placed in the bin 128 associated with the zone 164 intersected. Per-zone instruction bins 128 are thus used to hold primitive instructions and state-setting instructions required to render each sub-image and are generated by comparing the screen-space extent of each primitive 162 to the array of zones 164. Thus, as the primitives 162 are received, the present invention determines which zone(s) 164 each primitive 162 intersects, and replicates the primitive instructions into a bin 128 associated with each of these zones 164.

The process of assigning primitives (and their attributes) 162 to zones 164 is referred to as binning. "Bin"128 refers to the abstract buffer used for each zone—where a bin 128 will typically be realized as a series of instruction batch buffers 134. Binning performs the necessary computations to determine what primitives 162 lie in what zones 164 and can be performed by dedicated hardware and/or software implementations.

In one typical implementation, a driver 122 writes out a set of primitive instructions to be parsed by the graphics-binning engine 126. In particular, the information necessary for primitive binning is stored in vertex buffers 150, which includes first buffer 152 and second buffer 154. As discussed in detail below, first buffer 150 stores vertex X and Y data, while second buffer 154 contains the remainder of the vertex data. For each zone 164 intersected by a primitive 162, the graphics-binning engine writes corresponding primitive instructions into buffers 134 associated with the zones 164 intersected. Given the split vertex buffers 152 and 154, graphics binning-engine 126 is now permitted to read and cache only vertex screen X and Y data from first buffer 150. Some primitives 162 will intersect more than one zone 164, in which case the primitive instruction is replicated in bins 128 corresponding to the intersected zones 164. For example, the lightning bolt depicted in FIG. 3 intersects nine zones 164. This process is continued until the entire scene is sorted into bins 128.

Referring to FIG. 2, in a typical implementation, a graphics primitive and state-setting instruction stream, referred to as a scene input list 124, is initially applied to graphics-binning engine ring buffer 125 associated with graphics-binning engine 126. The scene input list 124 may be a single, temporally-ordered scene description as received by the application programming interface (API). Graphics-binning engine 126 is typically implemented as a hardware binning engine (HWB) 126. One skilled in the art will recognize that a software or software plus hardware binner could be used as well. The graphics-binning engine 126 parses scene input list 124 and determines which zone(s) 164 each primitive 162 intersects.

As previously noted, the zones 164 are associated with bins 128. Graphics-binning engine 126 compares the screen-space extent of each primitive 162 to the array of zones 164, and replicates the associated primitive commands into corresponding bins 128. Bins 128 are comprised of chained series of command buffers 134 typically stored within non-contiguous physical memory pages. A bin list is a list of buffers 134 which comprise each bin 132. Pages are initially allocated to the bin memory pool (BMP) 140. The bin pointer list 130 is initialized with the page numbers of the pages and stores write pointers into each bin list 132.

The graphics-binning engine 126 also maintains the current graphics state by parsing associated state-setting instructions contained with the scene input list 124. Prior to placing a primitive command in any given bin 128, the graphics-binning engine 126 typically precedes the primitive command in the bin 128 with any required state-setting instructions.

After the scene input list 124 has been completely parsed, the associated bins (i.e. bin 0, bin 1 . . . bin n-1) are ready to be used by the graphics-rendering engine 136 to render the scene. As discussed in detail below, instructions are included at the end of the scene input list 124 to cause the graphics-binning engine 126 to increment the register in pending scene counter 148 by one and initiate rendering of the binned scene. For example, graphics-binning engine 126 sends a render instruction to graphics-rendering engine ring buffer 157 associated with graphics-rendering engine 136 via path 156.

Once all the primitives 162 are sorted and the command structures completed, a second pass is made to render the scene one zone 164 at a time. Following the first pass of building a bin for each zone 164 intersected by a primitive 162, a second zone-by-zone rendering pass is performed. In particular, the bins 128 for all the zones 164 are rendered to generate the final image, with each scene rendered one zone 164 at a time. The order with which the zones 164 are rendered is typically not significant. All bins 128 associated with primitives 162 that touch pixels within a particular zone 164 are rendered before the next zone 164 is rendered. A single primitive 162 may intersect many zones 164, thus requiring multiple replications. As a result, primitives 162 that intersect multiple zones 164 are rendered multiple times (i.e. once for each zone 164 intersected).

Rendering performance improves as a result of the primitives 162 being sorted by their intersection with zones 164 that are aligned to the render cache 110. Since the graphics device 106 is only working on a small portion of the screen at a time (i.e. a zone 164), it is able to hold the frame buffer contents for the entire zone 164 in a render cache 110. The dimensions of the zone 164 are typically a constant tuned to the size and organization of the render cache 110. It is by this mechanism that the render cache 110 provides optimal benefits—reuse of cached data is maximized by exploiting the spatial coherence of a zone 164. Through use of the zone rendering mode, only the minimum number of color memory writes need be performed to generate the final image one zone 164 at a time, and color memory reads and depth memory reads and writes can be minimized or avoided altogether. Use of the render cache 110 thus significantly reduces the memory traffic and improves performance relative to a conventional renderer that draws each primitive completely before continuing to the next primitive.

Image/Bin Allocation

Figure 4:
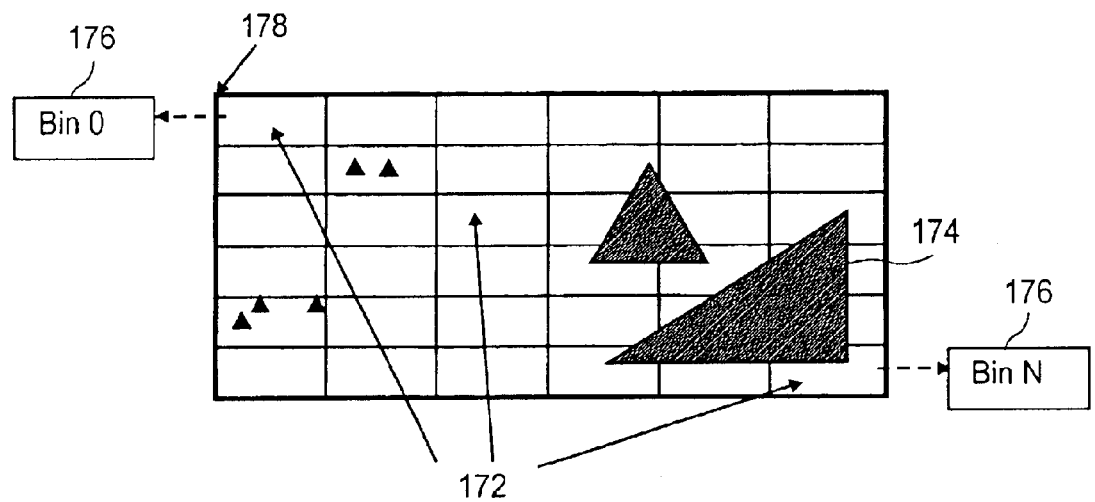
FIG. 4 illustrates a block diagram of an embodiment of a zone renderer screen view including zones, geometrical primitives and bins.

FIG. 4 illustrates a block diagram of an embodiment 170 of a zone renderer screen view of color buffer 178 including zones such as 172, geometrical primitives such as 174 and bins such as 176. As previously noted, color and depth buffers are divided into a 2-dimensional array of rectangular zones. During the first pass of the zone rendering process, each screen-space graphics primitive is compared against the array of zones, and commands to render the primitive are replicated into a "bin list" associated with each intersecting zone. As shown in FIG. 3, render cache 110 is employed to cache intermediate color and depth buffer values. Render cache 110 is logically organized as a two-dimensional cache and of a fixed total size, though has programmable dimensions and depth (bits per pixel) given the total size restriction. In a typical implementation, a 16 KB render cache 110 is split into two 8 KB for color values and 8 KB for depth values. Table 1 describes the possible zone dimensions (in pixels) for a typical implementation:

TABLE 1

| Max (color bpp, depth bpp) | Zone Size (pixels) |
|---|---|
| 16 bits | 64 wide × 64 high (4K pixels) |
|  | 128 wide × 32 high (4K pixels) |
| 32 bits | 64 wide × 32 high (2K pixels) |
|  | 32 wide × 64 high (2K pixels) |

Figure 5:
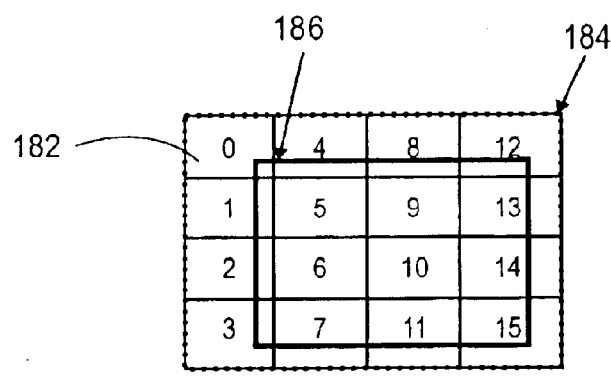
FIG. 5 illustrates a block diagram of an embodiment of zones, a bin array rectangle and a bin-clipping rectangle.

FIG. 5 illustrates a block diagram of an embodiment 180 of zones 182, bin array rectangle 184 and bin-clipping rectangle 186. In order to control cost and complexity, the number of supported bin lists (and therefore zones) is limited by the device implementation to N bins (and, correspondingly, N zones), where for N=512. For 32 bpp, multiplying the N bin limit by the 2K pixel size of the render cache yields support for 2N K pixel area for optimal zone rendering operation. In a typical implementation, this is 1M pixels for 32 bpp, 2M pixels for 16 bpp. However, the dimensions of the 3D image can exceed that area, and embodiments of the present invention permit zone rendering operation to remain functional and gracefully degrade with respect to performance.

Graphics-binning engine 126 (FIG. 2) uses two rectangles in the process of determining primitive-zone intersections: bin array rectangle 184 and binner clipping rectangle 186. Both of these rectangles 184, 186 are defined by graphics device state variables containing the screen-space location of the rectangle corners. Binner clipping rectangle 186 is used to define the visible region in screen coordinates. In most cases, the binner clipping rectangle 186 will coincide with the extent of color buffer 178 (FIG. 4), though one skilled in the art will recognize that this is not a requirement. Objects completely outside binner clipping rectangle 186 in one or more directions will be discarded. Objects that cannot be discarded will be subject to bin determination.

Bin array rectangle 184 is supported to handle color buffer resolutions larger than could otherwise be accommodated by the optimally-renderer image limits. If this threshold is exceeded, some portions of the scene will be rendering non-optimally. The non-optimal rendering is caused by rendering zones 182 larger than the optimal (cache-sized) zone size, where additional color/Z bandwidth may be required as the render cache 110 cannot contain the color and depth values for the enlarged zones.

When the color buffer resolution is at or below the threshold(s) (i.e., optimal conditions), bin array rectangle 184 is programmed to include all the zones 182 spanned by the binner clipping rectangle 186 (which should itself coincide with color buffer 178). Bin array rectangle 184 is positioned using the following rules:

The origin (Xmin, Ymin) corner of bin array rectangle 184 is aligned to a zone 182; and The (inclusive) width of bin array rectangle 184 is a multiple of the zone width.

However, the binner clipping rectangle 186 is used for trivial rejection and its maximum values need not be zone-aligned. In the case where binner clipping rectangle 186 maximum values are positioned within a zone 182, bin array rectangle 184 must still extend out to the zone boundaries. As shown in FIG. 5, bin array rectangle 184 maximum values would extend past binner clipping rectangle 186 maximum values to include the full zone extent along those edges.

In those cases where the (optimal_zone_size*max_bins) threshold pixel area is exceeded, bin array rectangle 184 is programmed using the following additional rules:

The corners are zone-aligned in X and Y, but need not coincide with the binner clipping rectangle 186 corners (e.g., the bin array rectangle 184 can be centered within the binner clipping rectangle 186, or justified to a certain edge of the binner clipping rectangle 186, etc).

The total area of the bin array rectangle 184 is equal (or less than) the (optimal_chunk_size*max_bins) threshold.

Together, bin array rectangle 184 and binner clipping rectangle 186 define a 2D array of zones with associated bin numbers.

Figure 6:
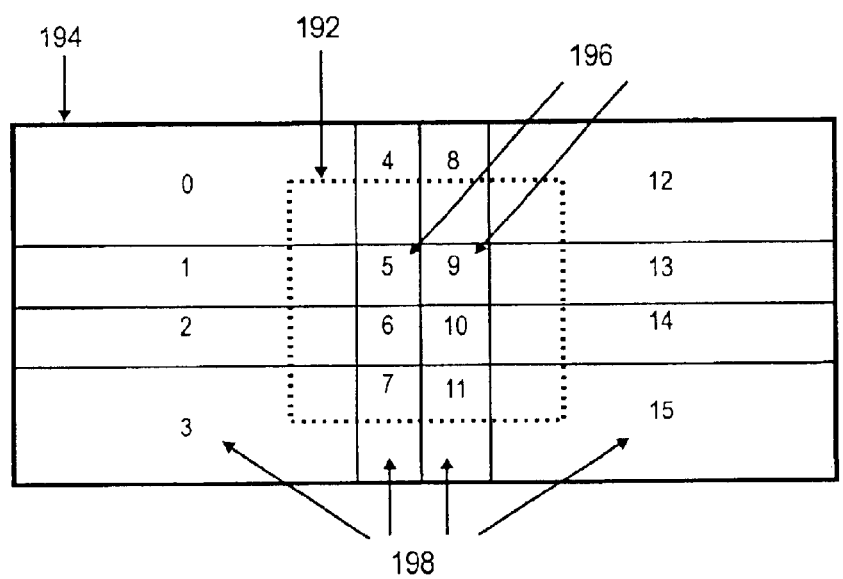
FIG. 6 illustrates a block diagram of an embodiment of binning with non-coincident bin array rectangle and bin clipping rectangle.

FIG. 6 illustrates a block diagram of an embodiment 190 of binning with non-coincident bin array rectangle 192 and bin clipping rectangle 194. For the case where bin array rectangle 192 is smaller than binner clipping rectangle 194, the interior zones 196 have optimal zone dimensions, though the zones 198 along the edges of bin array rectangle 184 are extended out to binner clipping rectangle 186 boundaries (as required) to define zones 198 larger than the optimal zone size.

Figure 7:
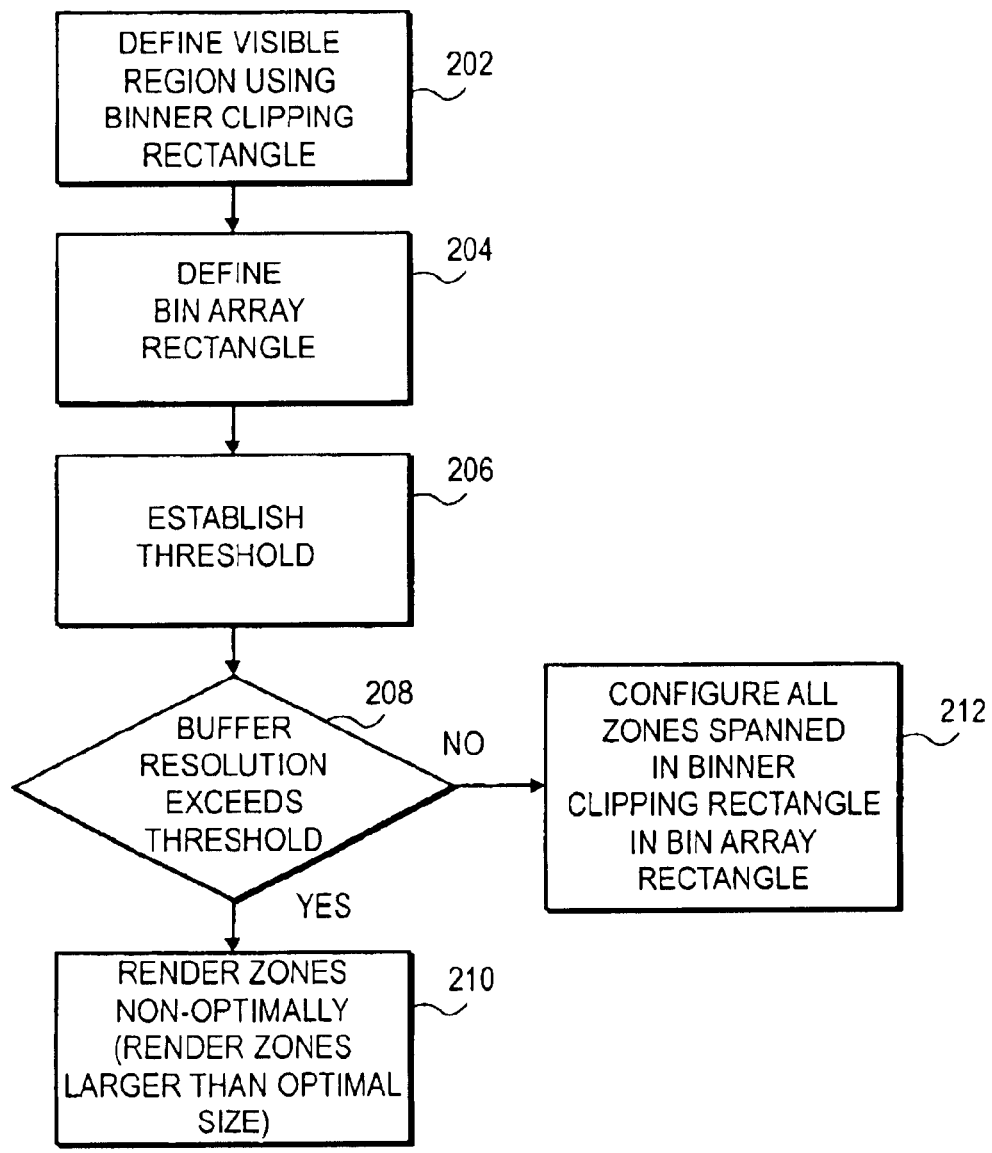
FIG. 7 illustrates a flow diagram of an embodiment of a process for efficient image/bin allocation for zone rendering.

FIG. 7 illustrates a flow diagram of an embodiment 200 of a process for efficient image/bin allocation for zone rendering. In particular, a visible region in screen coordinates using a binner clipping rectangle is initially defined (step 202). The binner clipping rectangle typically coincides with the extent of a color buffer. A bin array rectangle and threshold are defined to handle buffer resolutions (steps 204 and 206). The binner clipping rectangle and bin array rectangle are typically defined by graphics device state variables containing screen space location of rectangle corners.

When the buffer resolution exceeds the threshold (step 208), portions of the scene are rendered non-optimally (step 210). In particular, zones larger than optimal, all zone spanned by the binner clipping rectangle are configured in the bin array rectangle (step 212).

Having now described the invention in accordance with the requirements of the patent statutes, those skilled in the art will understand how to make changes and modifications to the present invention to meet their specific requirements or conditions. Such changes and modifications may be made without departing from the scope and spirit of the invention as set forth in the following claims.

What is claimed is:

1. A method for determining object-zone intersections for objects in a scene comprising:

defining a visible region in screen coordinates using a first rectangle;

handling buffer resolutions using a second rectangle and an area threshold, such that color buffer resolutions larger than could be otherwise accommodated by image limits are handled, wherein the first and second rectangles define a two dimensional array of zones with associated bin numbers;

in response to the second rectangle being smaller than the first rectangle, the zones along the edges of the second rectangle are extended out to first rectangle boundaries to define zones larger than the optimal zone size;

discarding objects completely outside the first rectangle in one or more directions; and subjecting non-discarded objects to bin determination.

2. The method of claim 1 wherein the first rectangle coincides with the extent of a color buffer.

3. The method of claim 1 wherein the first and second rectangles are defined by graphics device state variables containing screen space location of rectangle corners.

4. The method of claim 1 wherein handling color buffer resolutions using a second rectangle and threshold further comprises:

rendering portions of the scene non-optimally when the buffer resolution exceeds the threshold.

5. The method of claim 4 wherein rendering portions of the scene non-optimally when the buffer resolution exceeds the threshold further comprises:

rendering zones larger than optimal zone size.

6. The method of claim 1 wherein handling color buffer resolutions using a second rectangle and a threshold further comprises:

configuring all zones spanned by the first rectangle in the second rectangle when the buffer resolution is at or below the threshold.

7. The method of claim 1 further comprising positioning the second rectangle comprising:

aligning an origin corner of the second rectangle to a zone: and configuring a width of the second rectangle to be a multiple of a zone width.

8. The method of claim 7 wherein positioning the second rectangle further comprises:

zone aligning corners in X and Y; and configuring a total area of the second rectangle to be equal or less than the threshold.

9. The method of claim 1 further comprising:

extending zones along the edges of the second rectangle out to first rectangle boundaries to define zones larger than optimal zone size when the second rectangle is smaller than the first rectangle.

10. The method of claim 1 further comprising:

configuring zones having a same size when the first and second rectangle coincide.

11. A machine readable medium having stored therein a plurality of machine readable instructions executable by a processor to determine object-zone intersections for objects in a scene comprising:

instructions to define a visible region in screen coordinates using a first rectangle;

instructions to handle buffer resolutions using a second rectangle and an area threshold, such that color buffer resolutions larger than could be otherwise accommodated by image limits are handled;

in response to the second rectangle being smaller than the first rectangle, instructions to extend the zones along the edges of the second rectangle out to first rectangle boundaries to define zones larger than the optimal zone size;

instructions to discard objects completely outside the first rectangle in one or more directions; and instructions to subject non-discarded objects to bin determination.

12. The machine readable medium method of claim 11 wherein the first rectangle coincides with the extent of a color buffer.

13. The machine readable medium method of claim 11 wherein the first and second rectangles are defined by graphics device state variables containing screen space location of rectangle corners.

14. The machine readable medium method of claim 11 wherein instructions to handle color buffer resolutions using a second rectangle and threshold further comprises:

instructions to render portions of the scene non-optimally when the buffer resolution exceeds the threshold.

15. The machine readable medium method of claim 14 wherein instructions to render portions of the scene non-optimally when the buffer resolution exceeds the threshold further comprises:

instructions to render zones larger than optimal zone size.

16. The machine readable medium method of claim 11 wherein instructions to handle buffer resolutions using a second rectangle and a threshold further comprises:

instructions to configure all zones spanned by the first rectangle in the second rectangle when the buffer resolution is at or below the threshold.

17. The machine readable medium method of claim 11 further comprising instructions to position the second rectangle comprising:

instructions to align an origin corner of the second rectangle to a zone; and instructions to configure a width of the second rectangle to be a multiple of a zone width.

18. The machine readable medium method of claim 17 wherein instructions to position the second rectangle further comprises:

instructions to zone align corners in X and Y; and instructions to configure a total area of the second rectangle to be equal or less than the threshold.

19. The machine readable medium of claim 11 further comprising:

instructions to extend zones along the edges of the second rectangle out to first rectangle boundaries to define zones larger than optimal zone size when the second rectangle is smaller than the first rectangle.

20. The machine readable medium of claim 11 further comprising:

instructions to configure zones having a same size when the first and second rectangle coincide.

21. An apparatus to determine object-zone intersections for objects in a scene comprising:

a first rectangle to define a visible region in screen coordinates; and a second rectangle to handle buffer resolutions based on an area threshold such that color buffer resolutions larger than could be otherwise accommodated by image limits are handled, wherein in response to the second rectangle being smaller than the first rectangle, the zones along the edges of the second rectangle are extended out to first rectangle boundaries to define zones larger than the optimal zone size;

wherein objects completely outside the first rectangle in one or more directions are discarded and non-discarded objects are subject to bin determination.

22. The apparatus of claim 21 wherein the first rectangle coincides with the extent of a color buffer.

23. The apparatus of claim 21 wherein the first and second rectangles are defined by graphics device state variables containing screen space location of rectangle corners.

24. The apparatus of claim 21 further comprising:

a device to render portions of the scene non-optimally when the buffer resolution exceeds the threshold.

25. The apparatus of claim 24 wherein the device renders zones larger than optimal zone size.

* * * * *